May 10, 1932. A. R. LAFFERTY 1,857,815
APPARATUS FOR AUTOMATICALLY DELIVERING ARTICLES IN A UNIFORM MANNER
Filed March 23, 1929 5 Sheets-Sheet 1
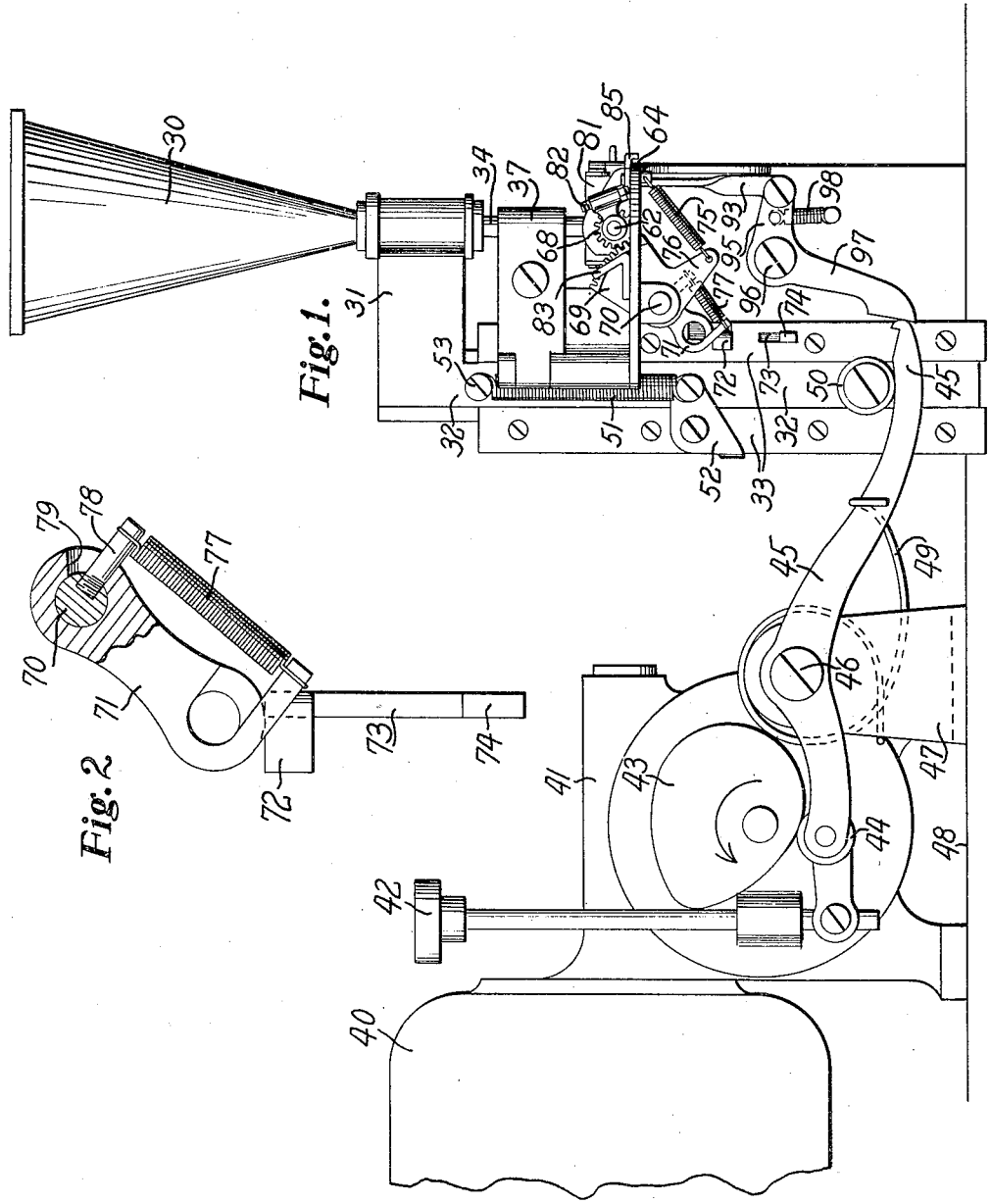
INVENTOR
Arthur R. Lafferty
BY
Rector, Hibben, Davis, & Macauley
ATTORNEYS May 10, 1932.  A. R. LAFFERTY  1,857,815
APPARATUS FOR AUTOMATICALLY DELIVERING ARTICLES IN A UNIFORM MANNER
Filed March 23, 1929  5 Sheets-Sheet 2
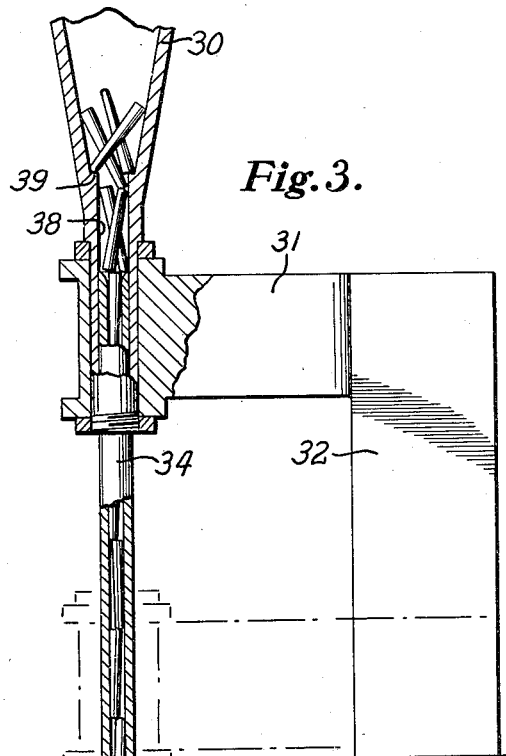
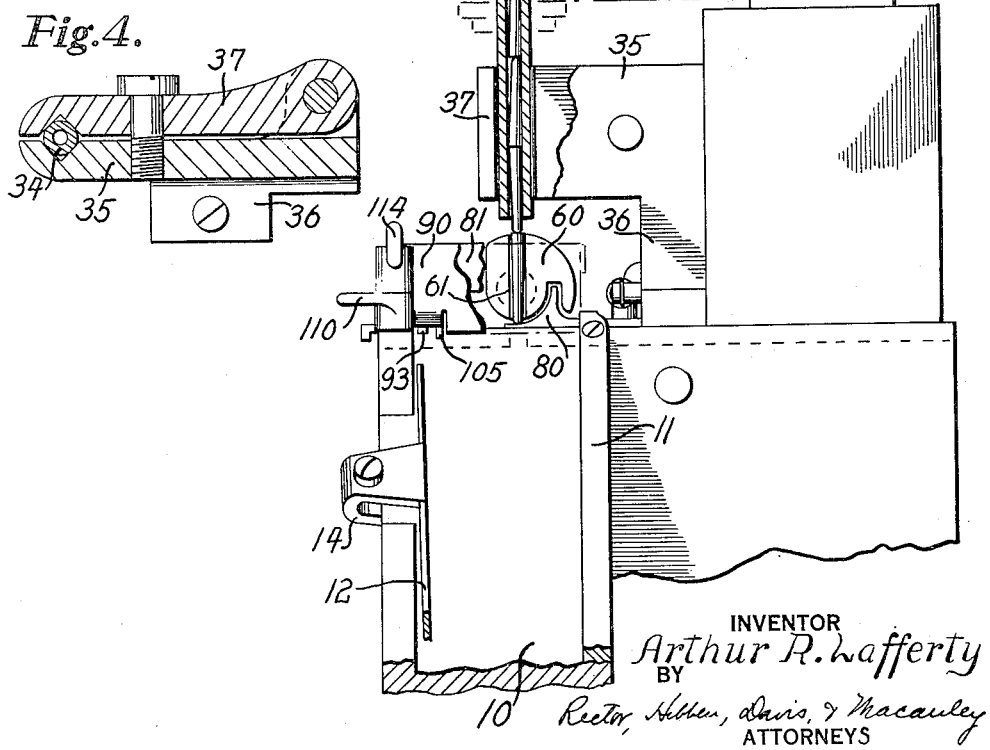
INVENTOR
Arthur R. Lafferty
BY
Rector, Hibben, Davis, & Macauley
ATTORNEYS

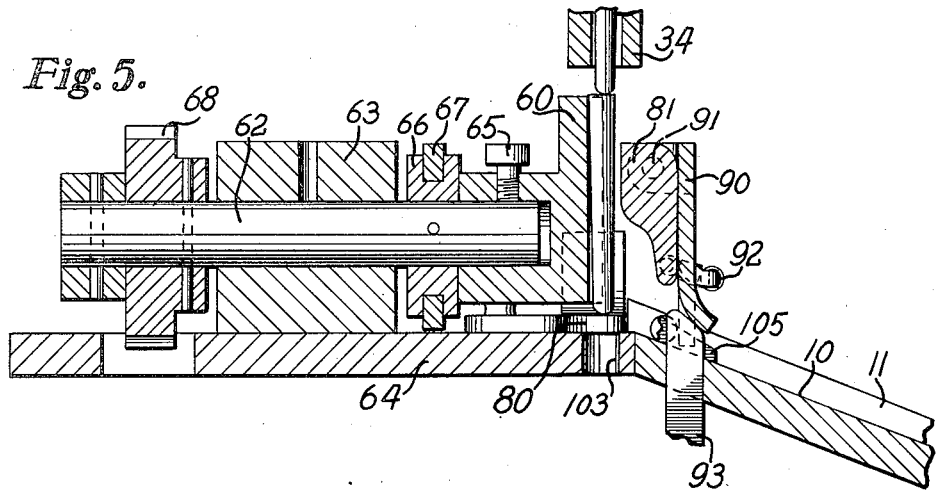
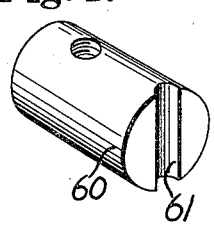
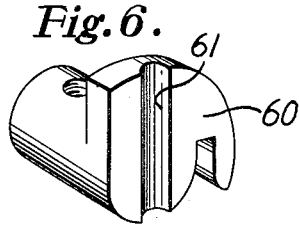
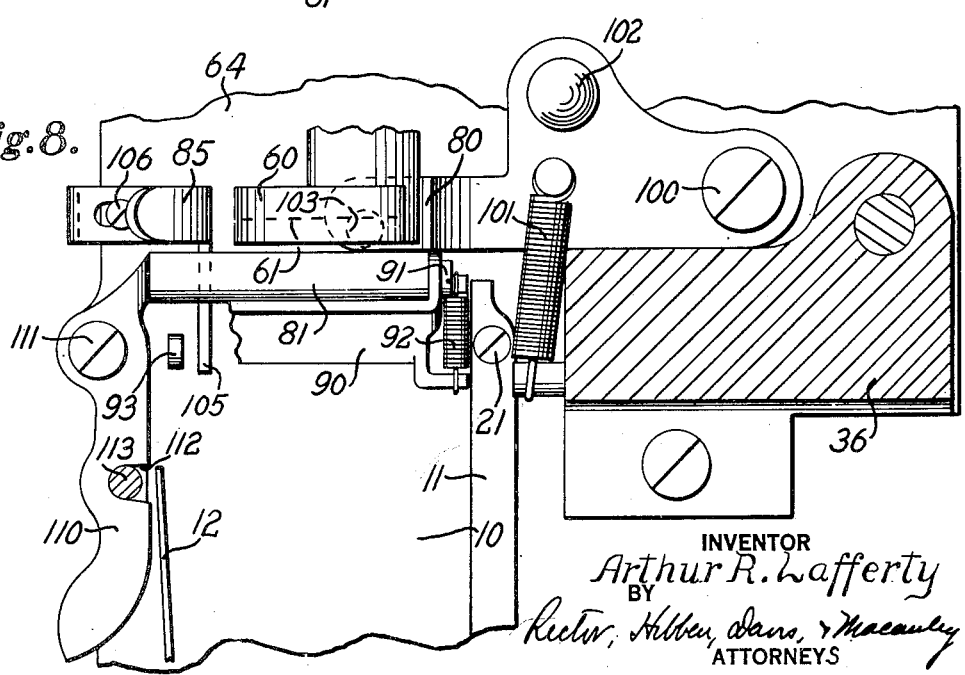

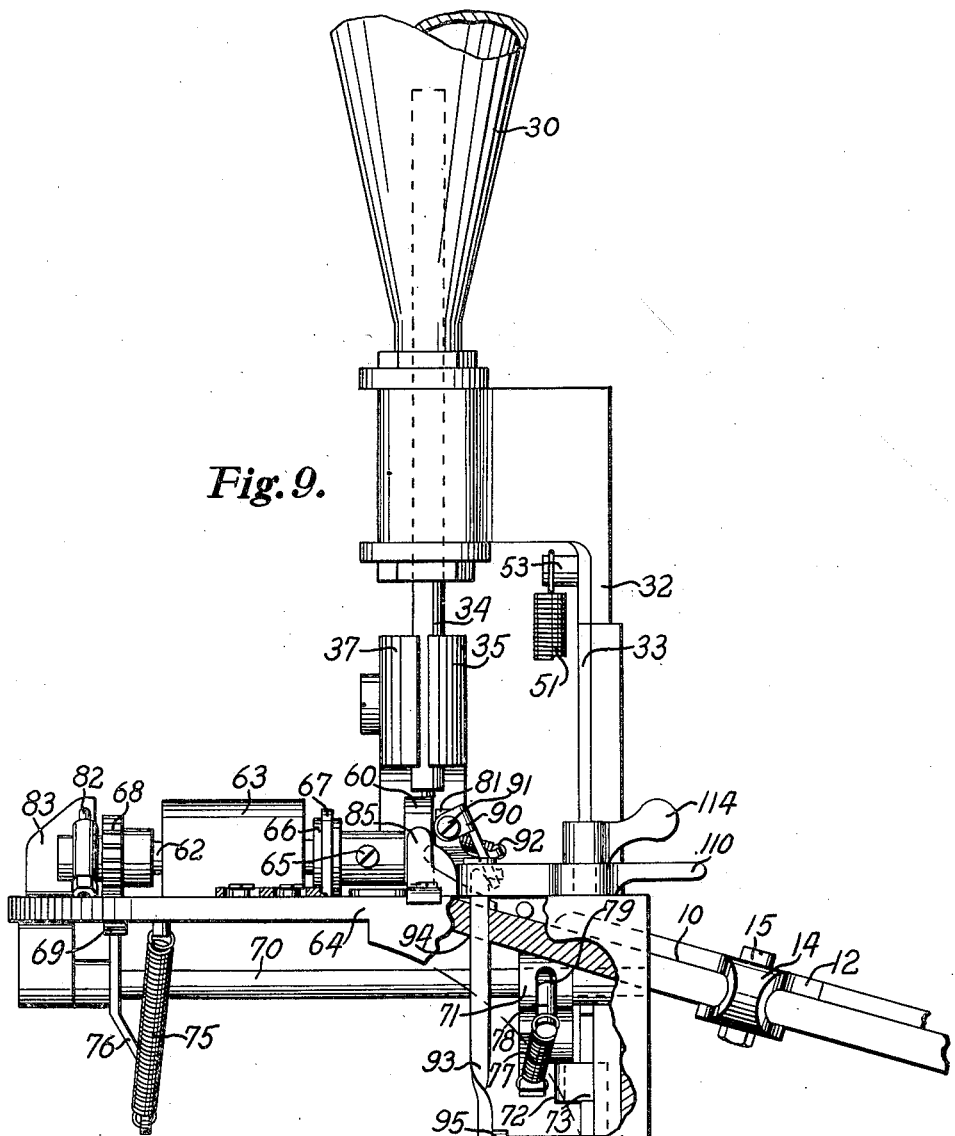

May 10, 1932.  A. R. LAFFERTY  1,857,815
APPARATUS FOR AUTOMATICALLY DELIVERING ARTICLES IN A UNIFORM MANNER
Filed March 23, 1929     5 Sheets-Sheet 5

INVENTOR
Arthur R. Lafferty
BY
Rector, Hibben, Davis, & Macauley
ATTORNEYS

Patented May 10, 1932

1,857,815

UNITED STATES PATENT OFFICE

ARTHUR R. LAFFERTY, OF DETROIT, MICHIGAN, ASSIGNOR TO BURROUGHS ADDING MACHINE COMPANY, OF DETROIT, MICHIGAN, A CORPORATION OF MICHIGAN

APPARATUS FOR AUTOMATICALLY DELIVERING ARTICLES IN A UNIFORM MANNER

Application filed March 23, 1929. Serial No. 349,290.

This invention relates to a method and apparatus for automatically delivering articles in a uniform manner. It has been developed especially for delivering tapered pins to an automatic gauging or sorting machine with the same ends of the pins always in the same position, but it can also be used with other types of machines into which it is desired to feed tapered pins, rollers, or similar articles.

In delivering tapered articles such as pins, rollers, etc., to a machine, it is not only necessary to deliver the articles one at a time, but it is also necessary to present the same end of each pin to the reciving die or holder. Otherwise, the article will not enter the die as it is usually tapered to the same degree as the articles. On account of this difficulty, tapered articles are usually fed into a machine by hand and the operator is depended upon for the proper insertion of each article. Hand operation is a relatively slow and expensive process and the present invention has been devised to provide an improved method and apparatus for automatically delivering tapered articles into a machine, the invention comprehending not only the automatic delivery of the articles one by one but the arranging of them in uniform position.

An object of the invention is to provide an improved method of arranging tapered articles in uniform position.

Another object is to provide an improved apparatus for automatically delivering tapered articles to a machine which is to perform some operation on them.

Still another object is to provide an improved method and apparatus for delivering tapered articles one by one to a machine and for arranging them to uniform position as they are delivered.

Other objects and advantages of the invention will appear from the following specification and drawings.

An embodiment of the invention is shown in the accompanying drawings in which,

Figure 1 is a rear elevation of an apparatus embodying the invention, the parts being shown in normal position;

Fig. 2 is a fragmentary cross-section and rear elevation of a portion of the operating mechanism;

Fig. 3 is a front sectional elevation showing how the tapered pins are agitated in the hopper from which they are fed and how they are received by the discharging mechanism which discharges them in horizontal position;

Fig. 4 is a fragmentary cross-section on the line 4—4 of Fig. 3 showing how the discharge tube is adjustably held in position;

Fig. 5 is a partial cross-section showing the parts for receiving the pins from the hopper;

Fig. 6 is a perspective view of the disk for receiving the pins;

Fig. 7 is a perspective view of a modified form of disk;

Fig. 8 is a partial plan view;

Fig. 9 is a left side elevation of the machine with the parts in normal condition;

Fig. 10 is a partial front elevation with some of the parts broken away, the view showing how the pins are turned to horizontal position;

Before describing an apparatus for practicing the method, the method of arranging and delivering the articles will be explained. This method takes advantage of the shape of the articles to arrange them end on end in a uniform manner, the method being very simple and inexpensive and not requiring complicated apparatus.

Figure 11:
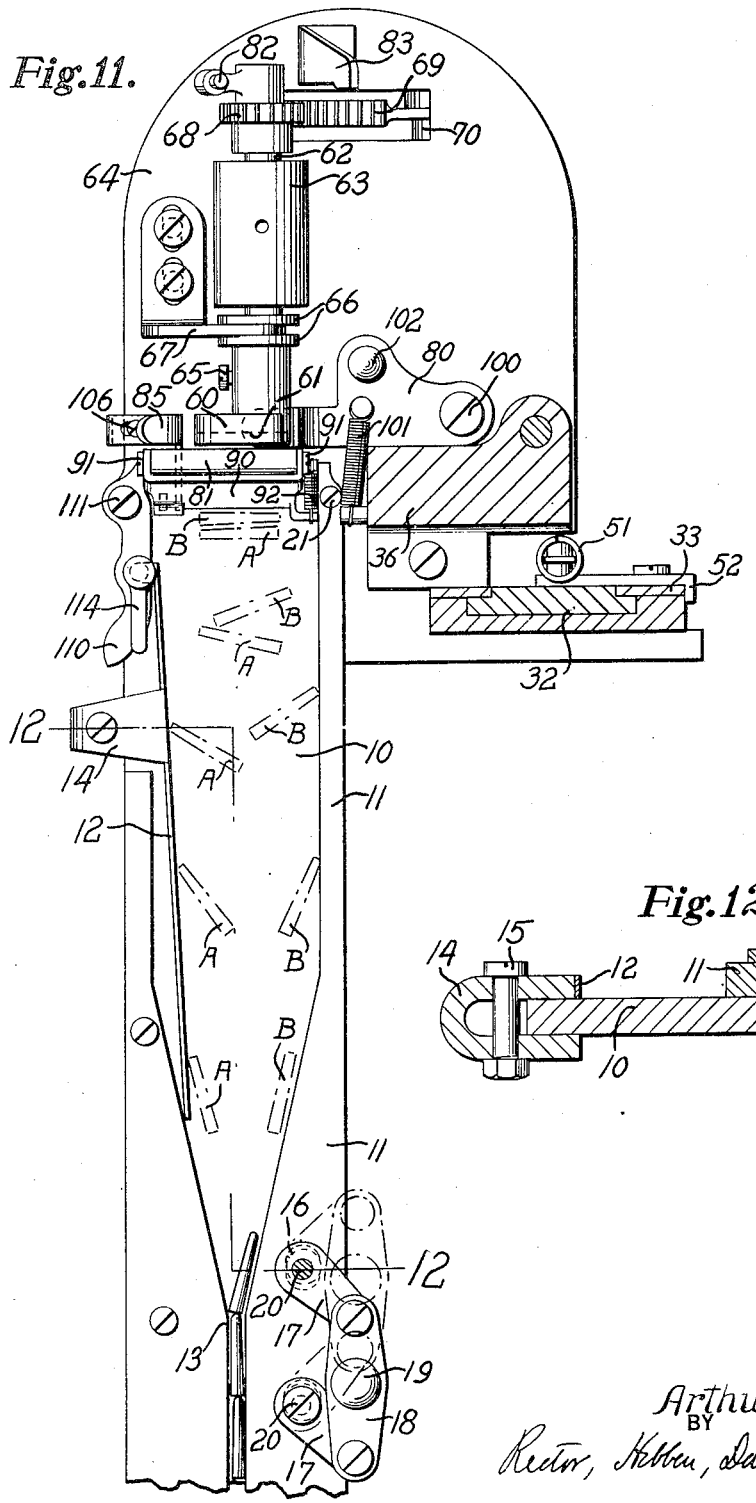
Fig. 11 is a sectional plan view showing particularly how the pins are arranged in uniform position on the inclined surface of the discharge chute.

Referring to Fig. 11, a tapered pin, such as the pin A, is positioned horizontally on an inclined surface 10 which forms the bottom of a discharge chute. The pin is positioned transverse to the longitudinal axis of the chute, the surface being inclined sufficiently to cause the pin to roll and slide down it. The pin is then permitted to roll and slide down the inclined surface, during which movement the larger and heavier end of the pin will travel ahead of the smaller end and the pin will move in a downward, lateral curve, following approximately the path indicated by the dot and dash positions of pin A in Fig. 11. The movement of the pin transversely of the chute is arrested when the pin reaches a substantially longitudinal position, the arresting being done, in the apparatus illustrated, by guides 11 and 12 at the sides of the inclined surface, both guides being adjustable as will be explained presently. In the apparatus illustrated, the pins are positioned on the incline slightly to the right of its longitudinal center line which usually makes it unnecessary to adjust the right guide 11 even though different sized pins are used, but adjustment of the left guide is necessary because, if small pins which roll in a rather sharp curve are allowed to move too far transversely, they may turn entirely around or the larger end of the pin may strike the guide first and the momentum will cause the pin to swing or flip around so that the small end goes down first. By properly adjusting the guides so that the small end of each pin first strikes one of the guides this flipping or twisting is prevented and the pins follow the path shown in Fig. 11. Two pins are illustrated in Fig. 11 although, in practicing the method, only one pin is fed at a time. Two pins are illustrated to show the paths of pins whose larger ends are placed to the right and left respectively. When the pins are placed in the position of the pin A with the large end to the right, they strike the left-hand guide as they roll down, while, if they are in the position of pin B, they strike the right-hand guide.

After the pins have swung around to approximately longitudinal position relative to the inclined surface, they slide on down and are directed into a passageway 13 by the converging guides 11 and 12, each pin entering the passageway with its large end first.

From the above it will be clear that the pins are arranged in uniform order by positioning them horizontally on an inclined surface and transverse thereto. They are then permitted to roll and slide down, their transverse movement being limited so that the pins stop in an approximately longitudinal position after which they are guided into a passageway.

Figure 12:
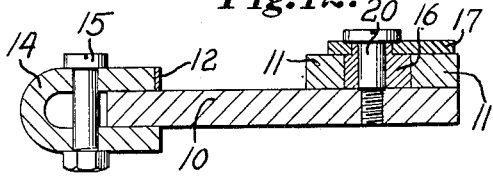
Fig. 12 is a section on the line 12–12 of Fig. 11.

In the apparatus shown, the left-hand guide 12 (Fig. 11) has an extension clamp 14 (Fig. 12) which is bent under the inclined surface or bottom 10 of the delivery chute. The guide is adjustably held in position by a bolt and nut 15 which extends through the bent over extension and clamps it in adjusted position. When different diameter pins are used, it is desirable to adjust the size of the passageway 13 and this may be done by means of the eccentrics 16 carried on the under sides of the arms 17 which are connected by a link 18 having a knob 19. The eccentrics turn on pivots 20 mounted on the stationary bottom 10 and they operate in holes in the lower end of the side guide 11 which is made movable for this purpose, the holes being shaped to prevent binding when the eccentrics are turned. When the link 18 is swung from the full toward the dotted line position of Fig. 11, the eccentrics are moved so as to gradually move the guide 11 inwardly to make the passageway 13 narrower, the guide turning on its pivot 21 near its top end. This provides convenient means for adjusting the passageway to pins of various diameters.

The pins are automatically delivered onto the inclined surface one at a time by a mechanism which is preferably timed with the mechanism of the machine which is to receive them. Referring to Figs. 1 and 3, a hopper 30 in the shape of an inverted cone is provided to receive the pins in bulk. This hopper is carried on a lateral arm 31 projecting from a slide 32 which reciprocates between guides 33 to move the hopper up and down between the full line and the dot and dash line positions of Fig. 3. The hopper slides on a hollow tube 34 mounted in an arm 35 projecting from the frame piece 36, the tube being adjustable vertically in the arm and held in position by a clamp 37 shown in detail in Fig. 4. When the hopper is in its raised position illustrated in Fig. 3, the upper end of the tube 34 is in the opening 38 in the neck of hopper 30. As the hopper is lowered the relative position of the tube and the hopper changes until these parts occupy the position illustrated in Fig. 9 with the tube projecting into the interior of the hopper. The opening in the tube 34 is only of sufficient diameter to receive the tapered pins end on end. As the hopper moves down, the end of the tube passes through the pins in the hopper, agitates them, and causes one or more of the pins to enter the tube. The lower end of the hopper has a shoulder or ledge 39 which tends to arrest the pins and prevent them from jamming in the hopper neck.

It will be readily seen that because of the conical shape of the hopper, the tendency for the pins is to align themselves in approximately vertical position toward the bottom of the hopper. Some of them will probably drop into the neck of the hopper as illustrated in Fig. 3. If they do not drop directly into the opening in the tube 34 they drop sufficiently near it so that, as the hopper is lowered, the nearest pin will pass into the opening in the tube, the opening being slightly beveled. If none of the pins drop into the tube while it is in the neck of the hopper, the downward movement of the hopper resulting in the movement of the body of pins over the end of the tube will agitate or stir up the pins and invariably cause one or more of them to enter the tube. The pins are thus automatically fed into the tube 34 which delivers them in a vertical position to a discharging mechanism which will be described later.

The hopper is reciprocated by a power driven operating mechanism including an electric motor 40 illustrated in Fig. 1. The motor drives a reduction gear and clutch contained in the housing 41, the clutch being controlled by a hand operated rod 42. Connected to the clutch is a cam 43 which is rotated in a counterclockwise direction by the motor as illustrated in Fig. 1. The cam operates on a roller 44 on the end of an arm 45 pivoted at 46 to a standard 47 supported by the frame plate 48. The arm 45 is urged clockwise by a spring 49 to keep the roller 44 in engagement with the cam 43. The righthand end of the arm 45 projects under a roller stud 50 carried by the slide 32 that supports the hopper 30. As the cam 43 rotates counterclockwise from its Fig. 2 position, the arm 45 is rocked counterclockwise which raises the slide 32 and the hopper 30. After the highest portion of the cam passes the roller 44, the spring 49 returns the arm 45 clockwise and the hopper 30 together with the slide 32 descends toward its original position by gravity and through the action of the spring 51 one end of which is connected to a plate 52 fixed to the guide 33 and the other end to a stud 53 on the slide 32.

The operating mechanism just described is usually adapted to operate in timed relation with the machine to which the pins are to be delivered, in order that the hopper may automatically deliver the pins to the machine at the rate at which the machine is capable of receiving them. This timing is accomplished by using the same driving motor for operating the machine as is used for operating the delivery mechanism.

The tapered pins pass out of the tube 34 in a vertical position which is not the position in which it is desired to have them delivered onto the inclined surface 10. In order that they may be delivered to the inclined surface in horizontal position and transverse to said surface, an automatic mechanism has been provided for discharging them. This mechanism includes a disk 60, illustrated in Figs. 6, 7 and 9 having a semi-circular recess 61 diametrically located in its front face. The disk normally occupies the position illustrated in Figs. 9 and 10 where its edge blocks the discharge of pins from the tube 34. The disk may be oscillated, however, into position to receive a pin.

The disk is oscillated in timed relation to the movements of the hopper 30 by mechanism best illustrated in Figs. 1, 2, 5 and 9. The disk has a hub fitting over a shaft 62 journaled in a bearing 63 on the frame plate 64 of the machine, the hub being held on the shaft by a set screw 65. Pinned to the shaft 62 is a sleeve 66 having an annular groove in its outer surface for receiving an adjusting bracket 67 which may be moved longitudinally to adjust the position of the sleeve and the shaft 62 to adjust the position of the disk 60 for different diameter pins.

Fixed on the end of the shaft 62 is a gear 68 with which meshes a toothed sector 69 fixed on a shaft 70. Yieldingly connected to the shaft 70 is an arm 71 whose free end is positioned in the path of a lug 72 on a slide 73 mounted in one of the guides 33 (Fig. 1). The slide 73 has a lug 74 on it which projects into the path of the arm 45. The shaft 70 is urged counterclockwise by a spring 75 connected to an arm 76 fixed to shaft 70. The arm 71 is connected to shaft 70 by a yielding connection (Fig. 2) including a spring 77 one end of which is connected to arm 71 and the other end to a pin 78 in shaft 70. A slot 79 permits arm 71 to have a slight movement relative to shaft 70 to allow for overthrow as will be later described.

During its upward movement, the arm 45 engages the lug 74 and moves the slide 73 upward. This rocks the arm 71 and shaft 70 clockwise which moves the toothed sector 69 clockwise and rotates the shaft 62 counterclockwise as viewed in Fig. 1. This oscillates the disk 60 counterclockwise from its normal position of Figs. 9 and 10 to that of Fig. 3, where the recess 61 is in alignment with the opening in tube 34. The disk 60 is arrested in its Fig. 3 position by the stationary projection 83 and overthrow of the arm 71 is provided for by the slot 79 (Fig. 2) and the yielding connection heretofore described.

When this occurs one of the tapered pins passes out of the tube 34 and enters the recess 61, the pin descending until it strikes the curved guide 80 which prevents it from descending beyond a predetermined limit. The diameter of the disk 60 is such that when the first pin strikes the guide 80 the upper end of the pin is slightly above the edge of the disk. In order to prevent the pins from falling out of the recess 61 when being fed thereto, a retaining plate 81 (Figs. 5 and 9) is provided which is positioned closely adjacent the face of the disk 60 and slightly above its horizontal diameter as illustrated. The shape of disk 60 is best illustrated in Fig. 6, this being the shape used for relatively long pins. When shorter pins are used a disk such as shown in Fig. 7 may be employed.

After a tapered pin has been fed to the disk 60, the disk is returned counterclockwise from the position of Fig. 3 to that of Fig. 9 where the recess 61 occupies a horizontal position. This movement results from the fact that, as the lever 45 returns clockwise, it releases the lug 74 whereupon the spring 75 returns shaft 70 and its associated parts to their original positions, the arm 71 and slide 73 following through tension of spring 77, the disk 60 being rotated counterclockwise from its Fig. 3 to its Figs. 9 and 10 position. The final position of the disk is determined by an adjustable stop 82 (Fig. 1) carried by the shaft 62, said stop engaging a stationary projection 83 on the frame plate 64. The disk 60 is limited in its movement in the opposite direction by the other end of stop 82 engaging the frame plate 64.

As the disk returns from its Fig. 3 position, its peripheral edge passes under the pin immediately above the one that is in the disk thereby holding the upper pin and those on top of it from moving down. As the disk moves counterclockwise to the position of Fig. 9, the tapered pin in it is prevented from moving endwise out of the recess by the guide 80 on one end and the guide 85 on the other (Fig. 10). When the disk is turned so that the recess 61 is horizontal, the pin is then slightly below the retaining plate 81 and in such position that it can drop out of the recess by gravity which it does, the pin falling onto the upper end of the inclined surface 10 in horizontal position.

After the pin has been discharged, the disk 60 moves back to the position of Fig. 3 to get another pin. As the recess 61 comes into alignment with the pins in the tube 34, the next pin drops down into the disk which then turns to horizontal position and discharges the second pin, the operation being continuous.

It will thus be observed that when the hopper reaches its upper position, the disk 60 is automatically turned to the position of Fig. 3 to receive a pin and that as the hopper descends the disk is rocked away to the position of Fig. 9 to discharge the pin.

Although the disk 60 discharges the pins in a horizontal position on the inclined surface 10, it is desirable to further control and align the pins as well as to release them at the proper movement and for this purpose an aligning means has been provided comprising an aligning plate and shutter 90 pivoted at 91 to both ends of the retaining plate 81 and urged to a vertical position by a spring 92 (Fig. 11) which keeps the plate substantially in contact with the surface 10. Positioned to engage the plate 90 is a push rod 93 slidably mounted in a guide slot 94 in the base of the chute 10, said link being pivoted to one arm 95 of a bell crank lever (Fig. 1) pivoted at 96. The other arm 97 of this bell crank lever is positioned in the path of the arm 45, the bell crank lever being urged clockwise by a spring 98. When the arm 45 occupies the position of Fig. 1, its end contacts the bell crank lever 95—97 and projects the link 93 upwardly which opens the shutter 90 to permit a pin behind it to slide down the chute 10. However, as soon as arm 45 moves upward, the bell crank lever 95—97 is released whereupon it is moved clockwise by spring 98 and the link 93 is lowered. This permits the aligning plate 90 to be moved down to pin-retaining position by the spring 92. When moved to such position, it catches the pin discharged by the disk 60 and holds it in horizontal position transverse to the discharge chute. The plate 90 remains in this position until the arm 45 returns downwardly to its Fig. 1 position. Near the end of its downward stroke the arm 45 engages the bell crank 95—97 and rotates it counterclockwise to project the link 93 upwardly to raise the aligning plate 90 to release the discharged pin.

The guide or stop plate 80 which limits the downward movement of the pins as they are fed into the disk 60 may be moved to permit pins to drop out of the disk. Referring to Fig. 8 the plate 80 is pivoted at 100 and urged counterclockwise by a spring 101. It may be moved clockwise against the tension of spring 101 by a handle 102 and, when so moved, it moves from under the pin in disk 60 and exposes a hole 103 in the frame plate 64. This permits the free pins to drop out and, if a pin has become stuck in the tube 34 a wire or the like may be pushed upwardly through hole 103 and into tube 34 to free the pin.

The guide plate 85 also has an extension 105 (Fig. 8) which projects along the chute so as to guard the push rod 93 to prevent pins from striking said rod and being turned out of position. The plate 85 may be adjusted by loosening the screw 106 (Fig. 8) and moving the plate in or out to the proper position.

The retaining plate 81 is carried by a right angle horizontal extension 110 which is pivoted at 111 (Figs. 9 and 11) to the frame of the machine. The extension 110 is slotted at 112 to straddle a stud 113 extending upward from the machine frame. A thumb nut 114 normally locks the extension 110 with the plate 81 and shutter 90 in operative position. If it is desired to again access to the disk 60, the thumb nut 114 is loosened and the extension 110 swung about its pivot which moves the plate 81 and shutter 90 away from the disk 60.

Operation

Although the operation of the various parts of the apparatus has been described, the sequence of operation will be better understood by following through a typical operation.

Starting with the parts in the position of Fig. 9, it will be noted that the hopper 20 is lowered, the aligning plate 90 is raised and the disk 60 occupies a position such that the slot 61 in it is in a horizontal position. As the arm 45 moves upwardly, the hopper starts to rise and almost immediately the bell crank 95—97 is released which allows the aligning plate 90 to move down to pin-retaining position relative to the inclined surface 10. Just before the hopper 30 reaches its upper position, the arm 45 strikes the lug 75 and the disk 60 is oscillated to turn the recess 61 into vertical position in alignment with the tube 34 whereupon one of the pins in the tube moves down into the recess. While the hopper is in its upper position the upper end of the tube 34 is in the neck of the hopper where other tapered pins may enter it.

As the arm 45 moves downwardly, the hopper moves down with it and the tube 34 moves through the tapered pins in the hopper to stir them up and to pick up other pins if any are in alignment with the opening in the tube. During the first part of the downward movement of the hopper, the arm 45 releases the lug 75 and the disk 60 is returned to horizontal position whereupon the tapered pin in it drops onto the inclined surface 10 and rolls down into engagement with the aligning plate 90 which temporarily holds it and which aligns it in horizontal position traverse to the inclined surface. Near the end of the downward movement of the hopper, the arm 45 strikes the bell crank 95—97 and the aligning plate or shutter 90 is raised to release the discharged pin to permit it to roll down the inclined surface.

The tapered pins are thus taken from the tube 34 while the hopper is in its upper position, turned horizontally while the hopper is descending, released onto the inclined surface 10, aligned, and then released to roll down the plane when the hopper reaches its lower or feeding position. The operation is a continuous automatic one, no hand operations being required.

It is to be understood that the structure shown is for purposes of illustration and that changes can be made in it without departing from the spirit and scope of the invention as defined by the claims.

I claim:

1. In a machine of the class described, a hopper for receiving tapered articles, a surface inclined so that tapered articles placed on it will roll and slide down said surface, means automatically discharging articles from said hopper one at a time onto said surface in horizontal position substantially transverse to the direction of inclination of said surface, means acting to accurately align each of said discharged articles in horizontal transverse position on said surface and to subsequently release the articles for movement down said surface, and guides limiting the transverse movement of said articles to arrest them in longitudinal position with their larger ends pointing downward, said guides also acting to guide the articles into alignment one behind the other.

2. In a machine of the class described, a hopper for receiving tapered articles, an inclined surface on which said articles are to be discharged, means automatically delivering said articles from said hopper in vertical position, a holder for receiving said vertically discharged articles one at a time as they are delivered, said holder being oscillatable in a vertical plane, and means automatically moving said holder to cause it to discharge the received article onto said inclined surface in a horizontal position transverse to the direction of inclination of said surface.

3. In a machine of the class described, a hopper for receiving tapered articles, an inclined surface on which said articles are to be discharged, means operable to automatically discharge said articles from said hopper in vertical position, a holder for receiving said vertically discharged articles, said holder normally preventing articles from being discharged from said hopper but being movable to release the article to be discharged, and means for moving said holder to a position to receive one of said articles and to subsequently move it to position to discharge said article horizontally on said surface, said holder acting to prevent discharge of another article from said hopper until said holder is again moved to position to receive another article.

4. In a machine of the class described, a hopper for receiving articles, a tube automatically delivering said articles from said hopper in vertical position, a disk below said tube having a semi-circular recess in its face, a horizontal retaining member bearing against the upper side of the recessed face of said disk, and means for automatically oscillating said disk to intermittently align said recess with said tube, and to return the recess to horizontal position, said retaining member acting to keep the article in said disk while the recess is out of horizontal position but permitting the article to be discharged when the recess reaches horizontal position.

5. In a machine of the class described, a hopper for receiving articles, means for moving said hopper from lowered to raised position and vice versa, a hollow tube through which said articles are discharged in vertical position, a movable holder beneath said tube for receiving said articles, operating means for moving said holder to cause it to discharge said articles in horizontal position when the hopper is in raised position, an aligning means for aligning the discharged articles in horizontal position and for temporarily detaining them, and connections operated by said operating means for moving said aligning means to release the articles when the hopper moves to its lower position.

In testimony whereof, I have subscribed my name.

ARTHUR R. LAFFERTY.